(12) United States Patent
Yao

(10) Patent No.: US 7,382,962 B1
(45) Date of Patent: Jun. 3, 2008

(54) FIBER STRETCHER APPARATUS

(75) Inventor: Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 11/850,867

(22) Filed: Sep. 6, 2007

(51) Int. Cl.
*G02B 6/00* (2006.01)
(52) U.S. Cl. ............... 385/136; 385/137; 385/147; 385/13
(58) Field of Classification Search ............... 385/136
See application file for complete search history.

(56) References Cited

U.S. PATENT DOCUMENTS

| | | | | |
|---|---|---|---|---|
| 5,723,856 A | * | 3/1998 | Yao et al. | 250/227.11 |
| 6,240,220 B1 | * | 5/2001 | Pan et al. | 385/13 |
| 6,396,994 B1 | * | 5/2002 | Philipson et al. | 385/136 |
| 6,498,891 B1 | * | 12/2002 | Montesanto et al. | 385/134 |

\* cited by examiner

*Primary Examiner*—Frank G Font
*Assistant Examiner*—Mary A El Shammaa
(74) *Attorney, Agent, or Firm*—Fish & Richardson P.C.

(57) ABSTRACT

Designs of fiber stretcher apparatus using one or more linear actuators to stretch fiber loops for various applications including variable optical delay lines and devices using such delay lines.

25 Claims, 14 Drawing Sheets

FIBER STRETCHER APPARATUS

BACKGROUND

This application relates to fibers and fiber devices.

Optical fiber can be used to generate variable optical delays by controlling the length of a fiber loop. For example, multiple turns of optical fiber can be wound around a cylindrical piezo-electric (PZT) actuator to form a fiber optical delay device where an electrical voltage is applied to the cylindrical PZT actuator to cause the diameter of the cylindrical PZT actuator to change. This change leads to a change in the circumference of the cylindrical PZT actuator and thus changes the level of stretching on the fiber loop. This design can be used to achieve fast delay variations and was described by Tearney et al. in an article entitled "Rapid acquisition of a in vivo biological images by use of optical coherence tomography," Optics Letters, Vol. 21, pp. 1408-1410 (1996). The response speed of such a PZT-based fiber delay device can be fast, e.g., on the order of KHz or tens of kHz.

Other variable optical devices have also been proposed for achieving fast delay variations. Examples include a delay device based on a rotating cube described by Su in "Achieving variation of optical path length by a few millimeters at millisecond rates for imaging turbid media and optical interferometry: A new technique," Optics Letters, Vol. 22, pp. 665-667 (1997), a delay device based on a rotating mirror pair by Yasa et al. in "A rapid scanning autocorrelation scheme for continuous monitoring of picosecond pulses," Optical communications, Vol. 36, pp. 406-408 (1981), a grating based Fourier domain resonant delay line disclosed by Tearney et al. in "High speed phase- and group-delay scanning with a grating-based phase control delay line," Optics Letters, Vol. 22, pp. 1811-1813 (1997), and an accousto-optic modulator based delay line by Yang et al. in "Rapid ultrafine-tunable optical delay line at the 1.55 um wavelength," Optics Letters, Vol. 23, pp. 1843-1845 (1998).

Fiber-based optical delay devices can be easily interfaced or integrated with fiber components and devices to provide various advantages. For example, fiber based devices can be designed to avoid alignment of optical components in free space or to achieve compact device packaging.

SUMMARY

The specification of this application describes, among others, designs of fiber stretcher apparatus using one or more linear actuators to stretch fiber loops for various applications including variable optical delay lines and devices using such delay lines.

In one aspect, an optical fiber device include a linear actuator responsive to a control signal to cause a dimensional change along a straight line; and a fiber stretcher frame comprising at least one expandable slot that is engaged to the actuator so that the dimensional change along the straight line is across the expandable slot to change a width of the expandable slot. The fiber stretcher frame is structured to amplify the dimensional change of the actuator to produce an amplified change in a circumference of an exterior surface of the fiber stretcher frame. This device also includes a fiber loop wrapping around the exterior surface of the fiber stretcher frame that changes a length of the fiber loop with the amplified change in the circumference of the exterior surface of the fiber stretcher frame.

In one implementation, the fiber stretcher frame is partially divided into a first frame part and a second frame part by the expandable slot. The first frame part and the second frame part are integral to each other and are connected at a pivot point around which the first and second frame parts move relative to each other under an operation of the actuator. In another implementation, the fiber stretcher frame includes a first frame part and a second frame part that are separated from each other by the expandable slot, and a resilient connector that connects the first frame part and the second frame part at a pivot point around which the first and second frame parts move relative to each other under an operation of the actuator. In yet another implementation, the exterior surface of the fiber stretcher frame includes straight sections and curved sections and the fiber loop is fixed to the exterior surface in a way that each fiber segment in the fiber loop located in a curved section is isolated from expansion and extraction of the stretcher frame and each fiber segment in the fiber loop located in a straight section expands and contracts with the stretcher frame. In yet another implementation, the fiber stretcher frame comprises a second expandable slot and the device includes a second linear actuator engaged to the second expandable slot to change a width of the second expandable slot as the second linear actuator exhibits a dimensional change along a straight line, the fiber stretcher frame structured to amplify the dimensional change of the second linear actuator to, collectively with the linear actuator, the amplified change in the circumference of the exterior surface of the fiber stretcher frame.

In another aspect, an optical fiber device includes an inner circular frame, exterior arc frames, and connectors connecting the exterior arc frames to the inner circular frame. The exterior arc frames are separate from one another and arranged to surround the inner circular frame to form an outer circle concentric with the inner circular frame. The connectors respectively connect the exterior arc frames to an outer surface of the inner circular frame, one connector per exterior arc frame, and each connector holds each exterior arc frame to the inner circular frame as an integral structure. This device also includes linear actuators arranged in a circle concentric with and engaged to the inner circular frame and each linear actuator is oriented to expand or contract along a straight line in a radial direction of the inner circular frame. Two linear actuators being engaged to one exterior arc frame are symmetrically located on two sides of a respective connector for the exterior arc frame to expand and contract to change a radial position of the exterior arc frame relative to the inner circular frame. A fiber loop is included in this device and is wrapped around the exterior surfaces of the exterior arc frames forming the outer circle under an initial stretch condition so that the fiber loop changes a length when the linear actuators expand and contract to change the circumference of the outer circle. In one implementation, screws can be mounted to the inner circular frame and engaged to press the linear actuators, respectively, along the radial direction against respective exterior arc frames and each screw is adjustable to change a position of a respective linear actuator to change the initial stretch on the fiber loop.

These and other examples and implementations are described in detail in the drawings, the detailed description and the claims.

DETAILED DESCRIPTION

Figure 1:
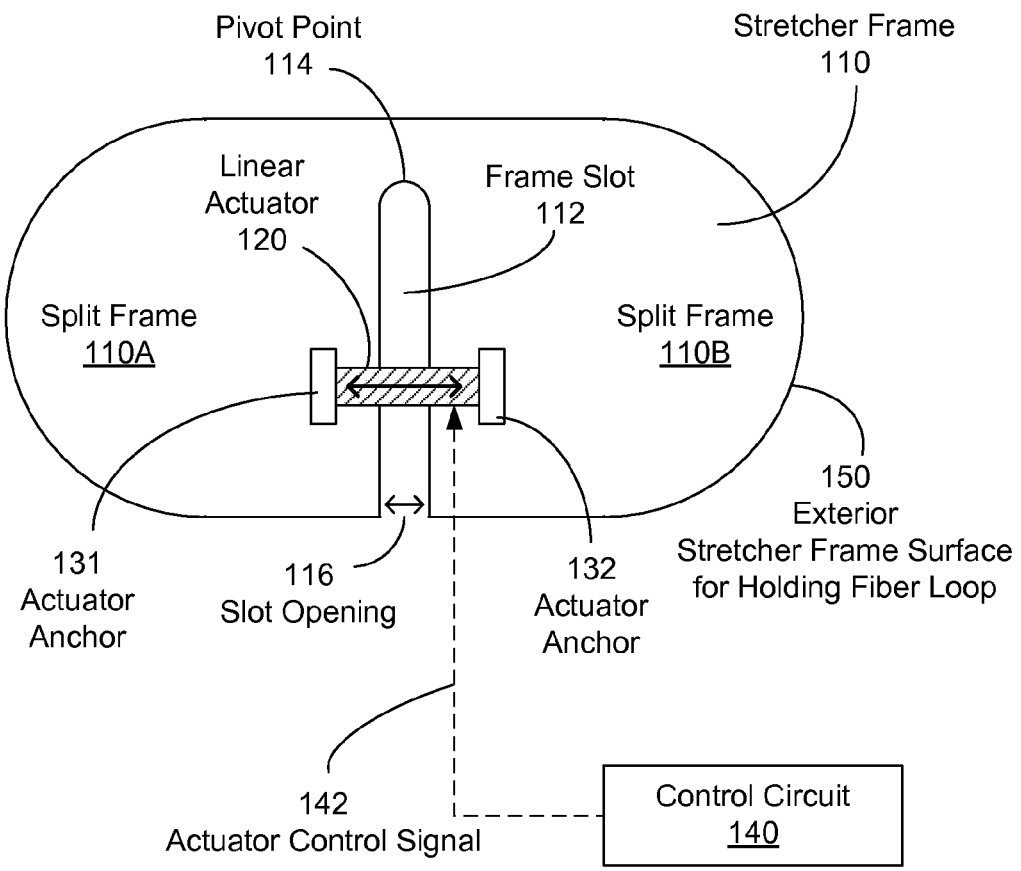
FIG. 1 shows one exemplary design of a fiber stretcher device using an actuator to control a dimension of an expandable slot in a stretcher frame.
Figure 1:
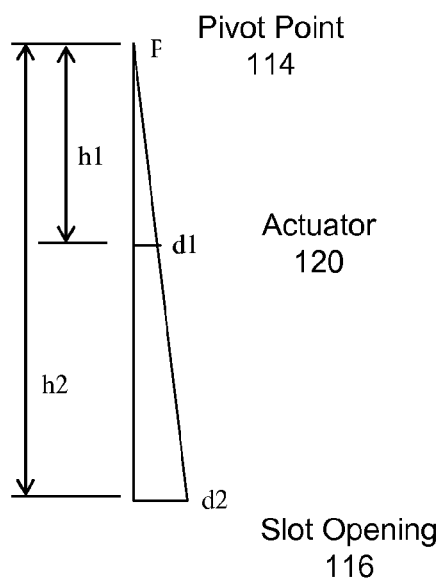

FIG. 1 shows one exemplary design of a fiber stretcher device using an electrically controlled actuator to control a dimension of a slot in a stretcher frame. The illustrated fiber stretcher device includes a stretcher frame 110 that has a frame slot 112 with a slot opening 116 at one end to separate the frame 110 into two parts 110A and 110B that are connected at the other end 114 of the frame slot 112. The frame slot 112 can be centered in the frame 110 to make two equal frame parts 110A and 110B or positioned to make frame parts 110A and 110B different in size and shape A linear actuator 120, which expands or contracts along a straight line in response to a control signal to produce a linear change in the dimension of the actuator along the straight line, can be positioned across the frame slot 112 with one end fixed to one frame part 110A and the other end fixed to the other frame part 110B. The linear expansion or contraction of the linear actuator 120 exerts a force across the frame slot 112 on the two frame parts 110A and 110B to cause them to pivot relative to each other around the connected end 114 of the frame slot 112. As the dimension of the actuator 120 changes, the change forces the separation of the two frame parts 110A and 110B on two opposite sides of the frame slot 112 to change accordingly. Therefore, the frame slot 112 is an expandable slot and acts like a spring. Notably, this design transforms a linear expansion or contraction of the actuator 120 into a change in the circumferential length of the stretch frame 110 which can be shaped in various shapes. This mechanism can be used to stretch a fiber loop formed by winding optical fiber around the exterior surface 150 of the stretcher frame 110 multiple times under tension. The exterior of the stretcher frame 110 can be configured to various shapes, e.g., having smooth curves on the exterior surface 150 for holding a fiber loop. Examples of the exterior surface include circles, ellipses, squares with round corners, rectangles with round corners, and racetrack shapes.

Therefore, this and other stretcher frame designs based on the present disclosure allow one or more linear actuators to be used to control a change in the circumferential length of a frame for stretching fibers without using cylindrical PZT actuators. Linear actuators, such as linear PZT actuators, are commercially available in large quantities and at relative low cost and can be easily packaged or integrated in various configurations to provide design flexibility in fiber stretchers based on the disclosure of this application. For example, because each linear PZT actuator has a limited expansion and contraction range, two or more PZT linear actuators can concatenate together as a combined actuator to increase the total expansion and contraction range of the combined actuator. Cylindrical PZT actuators tend to have small circumferences and thus have limited expansion and contraction ranges. It is difficult to combine two or more cylindrical PZT actuators to produce a larger circumferential change beyond the rang of each individual cylindrical PZT actuator. The stretcher frame designs that use one or more linear actuators can be structured to amplify the expansion and contraction ranges of the one or more linear actuators to produce large circumferential changes on the frames. This combination of transformation of a linear expansion or contraction of one or more linear actuators into a circumferential expansion or contraction of a fiber stretcher frame and the amplification of the linear expansion or contraction of one or more linear actuators can be advantageously used in various fiber stretcher frames.

Referring back to FIG. 1, the stretcher frame 110 can be made from various materials. For example, the frame 110 can be machined with a single piece of a solid material, such as a metal (e.g., aluminum or copper), an alloy (e.g., stainless steel), and a synthetic material (e.g., plastics). The slot 112 can be machined by milling, sawing, electro wire-cutting, or other process to create the slot opening 116 at the one end. The thickness of the attachment at the other end 114, which is the pivot point, depends on the material to be used and may be, e.g., from 0.1 mm to 10 mm. For better mechanical performance, a circular shape is formed around the pivot point b114 by drilling or other process. Alternatively, the slot 112 can be cut all the way through the completely separate the frame 110 into two separated frame parts 110A and 110B and a binder component can be used to connect the two frame parts 110A and 110B to form the pivot point 114. For example, a metal sheet between 0.01 mm to 10 mm can be used to bind two parts 110A and 110B together and act as a spring.

Two anchors 131 and 132 are formed on two frame parts 110A and 110B for engaging the two ends of the actuator 120, respectively. The actuator 120 is designed to change its dimension along the linear direction defined by the two anchors 131 and 132. The actuator 120 is a linear actuator that expands or contracts along one linear direction. The linear actuator 120 can be in various configurations, such as a piezo-electric actuator, an electro-strictive actuator, a magneto-strictive actuator, a magneto-mechanical actuator, and a linear motor actuator. A control circuit 140 is provided to control the operation of the actuator 120 by producing an actuator control signal 142 to drive the actuator 120. This control signal 142 can be electrical (e.g., when an PZT actuator is used) or magnetic (e.g., when a magneto-strictive actuator is used). The linear actuator 120 can be a combination of two or more concatenated linear actuators that are connected in series.

The arrangement in FIG. 1 provides an amplification mechanism to amplify the displacement produced by the actuator 120. Referring to the insert illustration in FIG. 1, the amount of the change in spacing at the slot opening 116 varies with the position of the actuator 120 along the frame slot 112 between the pivot point 114 and the slot opening 116. Assuming the actuator 120 is at a position is away from the pivot point 114 by h1 and the spacing between the pivot point and the slot opening 116 is h2, a spacing d1 of the frame slot 112 at the actuator 120 corresponds to a greater spacing d2 at the slot opening 116: d2/d1=h2/h1. Therefore, the smaller the h1 (i.e., the closer the actuator 120 is placed to the pivot point 114 is), the bigger the spacing d2 at the slot opening 116, provided that the actuator 120 can generate a sufficient force to overcome the counter force of the stretcher frame 110 and the stretched fiber around the stretcher frame 110. When the actuator 120 is placed at the center, the amount of amplification is 2.

The spacing between the actuator anchors 131 and 132 is designed to apply a preload on the linear actuator 120 and to apply an initial stretch on the fiber loop on the stretcher frame 110. This fiber initial stretch condition on the fiber loop allows the fiber frame 110 to decrease or increase the amount of stretch on the fiber loop as the linear actuator 120 contracts or expands. This initial fiber stretch condition can be achieved via various designs. In one design, for example, at least one screw can be mounted on one actuator anchor 131 or 132 to press against and hold one end of the linear actuator 120. This screw can be turned to press the linear actuator 120 and to expand the frame slot 112 so as to produce a desired slot opening 116 for the initial stretch condition on the fiber loop. In another design, one actuator anchor 131 or 132 may be an adjustable anchor that is movably engaged to frame 110 and can be moved in position relative to the other actuator anchor to adjust the spacing between the two actuator anchors 131 and 132 to achieve the above initial fiber stretch condition.

Figure 2A:
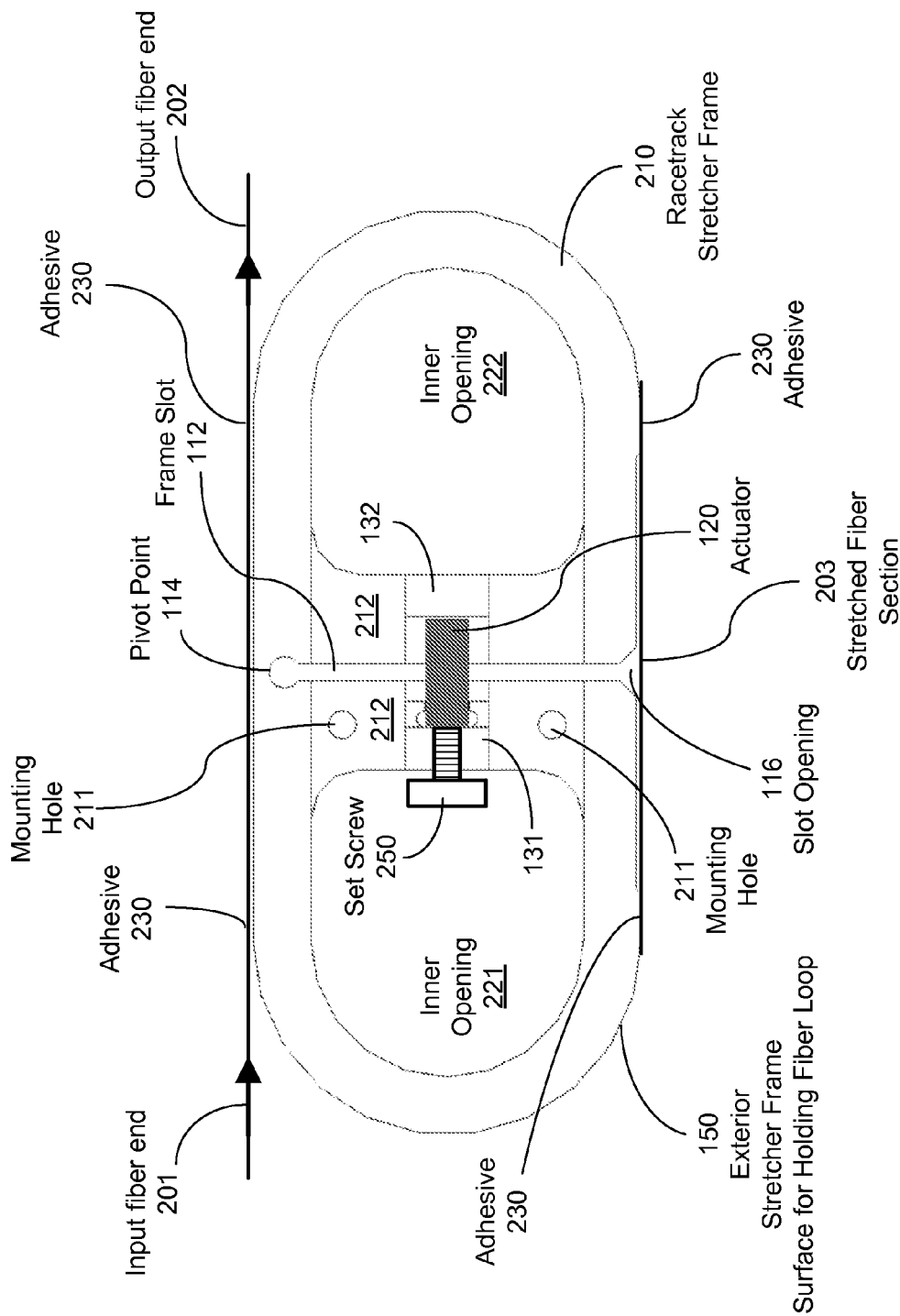
FIGS. 2A and 2B show one implementation of the design in FIG. 1 using a PZT linear actuator.
Figure 2B:
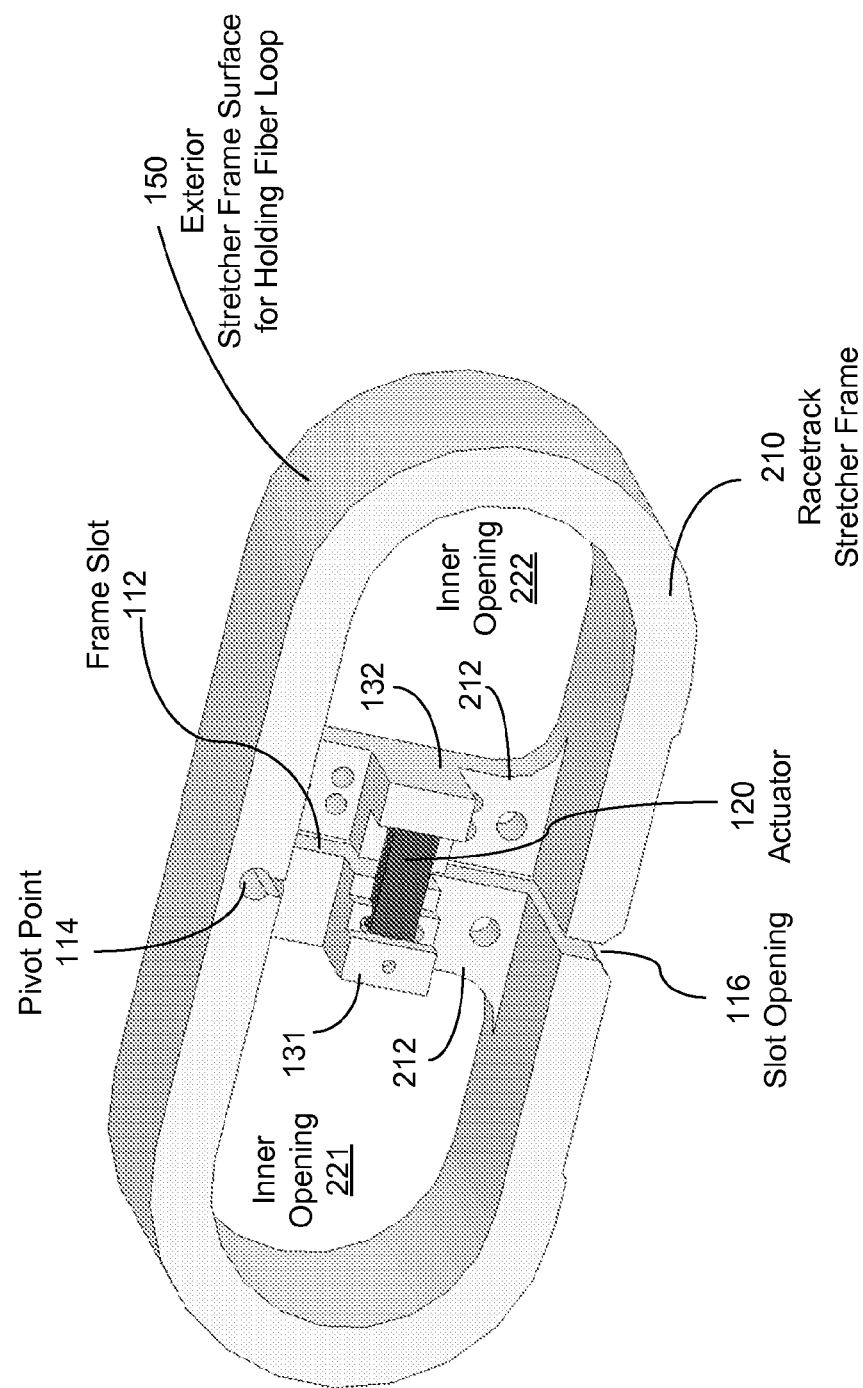

FIGS. 2A and 2B show one implementation of the design in FIG. 1 using a PZT linear actuator. In this design, a racetrack shaped stretcher frame 210 is used to support a smoothly curved exterior surface 150 for holding a fiber loop with an input fiber end 201 and an output fiber end 202. Interior portions of the stretcher frame 210 are removed to form inner openings 221 and 222 to reduce the overall weight while maintaining an interior portion 212 in the center of the frame 210. The frame slot 112 is formed in the interior portion 212 to split the frame 210 into two parts. The two anchors 131 and 132 are formed in the interior portion 212 for engaging the actuator 120 across the frame slot 112. The two anchors 131 and 132 may be shaped from the interior portion 212 as an integral part as shown in FIG. 2B or separate anchor components that are engaged to the interior portion 212. Mounting holes 211 can be formed in the interior portion 212 of the stretcher frame 210 for mounting the device to a support structure.

In this example, the actuator 120 is implemented as a linear piezo-electric actuator made from multiple PZT cells stacked together to achieve a relatively high expansion coefficient and can operate at a relatively low voltage for each PZT cell. For example, a PZT actuator with a total length of 10 mm, a total expansion of more than 10 microns may be achieved with a voltage of 150 volts. Such PZT actuators can be made at a relatively low cost because they are widely used and are commercially available in large quantities. Some commercial actuators are in a linear form with small sizes, with a length around a centimeter and a cross section of a few millimeters. As such, the cross section of these commercial PZT actuators is too small to wind fiber loops as fiber stretchers. The stretcher frame 210 shown in FIG. 2A and stretcher frames in other designs in this application can amplify the displacements of such linear PZT actuators to achieve sufficiently large fiber stretching for various optical delay applications including fast variable delay applications.

In this example, a set screw 250 is mounted on the anchor 131 and is pressed against to one end of the liner actuator 120 whose the other end is fixed to the anchor 132. The set screw 250 is turned to push the linear actuator 120 to expand the width of the frame slot 112 to set the fiber stretcher into an initial default stretch condition where a fixed tension is generated by the stretcher frame 210 on the fiber. This set screw 250 can also apply and adjust a pre-load force to the linear PZT actuator 120. The proper amount of pre-load force to the piezo actuator 120 can affect the performance and operation of the actuator 120. to have optimum piezo actuator performance. When the actuator control signal, such as a voltage, is applied to the actuator 120, the actuator 120 expands or contracts to cause the fiber loop wrapped around the race-track stretcher frame 210 to expand or shrink, and thus causing the optical delay to change.

Stretching can induce optical birefringence in the fiber and this induced birefringence can change the optical polarization of the light. To minimize a change in light polarization of the signal passing through the fiber loop in the fiber stretcher, adhesive 230 can be applied at the end of each straight part of the racetrack stretcher frame 210 to affix the fibers to the mechanical structure so that only a straight fiber section on the stretcher frame 210 undergoes expansion or contraction as the linear actuator 120 expands or contracts while a fiber section that is curved is isolated from the expansion or contraction. The stretching of a straight fiber section does not change the orientation of each principal axis of the fiber and thus does not change the light polarization. For example, adhesive 230 can be applied at four marked locations to fix the fiber as shown in FIG. 2A. This feature keeps curved or bended fiber portions under a fixed stretch and does not cause curved or bended fiber portions to expand or contract when the linear actuator 120 expands or contracts. The racetrack stretcher frame 210 in FIGS. 2A and 2B includes two parallel straight sections and the adhesive 230 is applied at two opposite ends of each straight section. Therefore, the fiber sections in the curved sections of the stretcher frame 210 are mechanically isolated from the stretching action caused by the linear actuator 120 and the action of the linear actuator 120 only applies to the straight section of the fibers to minimize the change in the optical polarization.

This and other fiber stretcher designs in this application that use a fiber stretcher frame to amplify the displacement of one or more linear PZT actuators can be implemented to allow for small linear PZT actuators with relatively low capacitances to be used to provide high speed tuning in optical delays at a relatively low operating voltage and low power consumption. Because mass-produced commercial PZT actuators can be used in the present designs, fiber stretchers can also be manufactured at a reasonable cost.

Figure 3A:
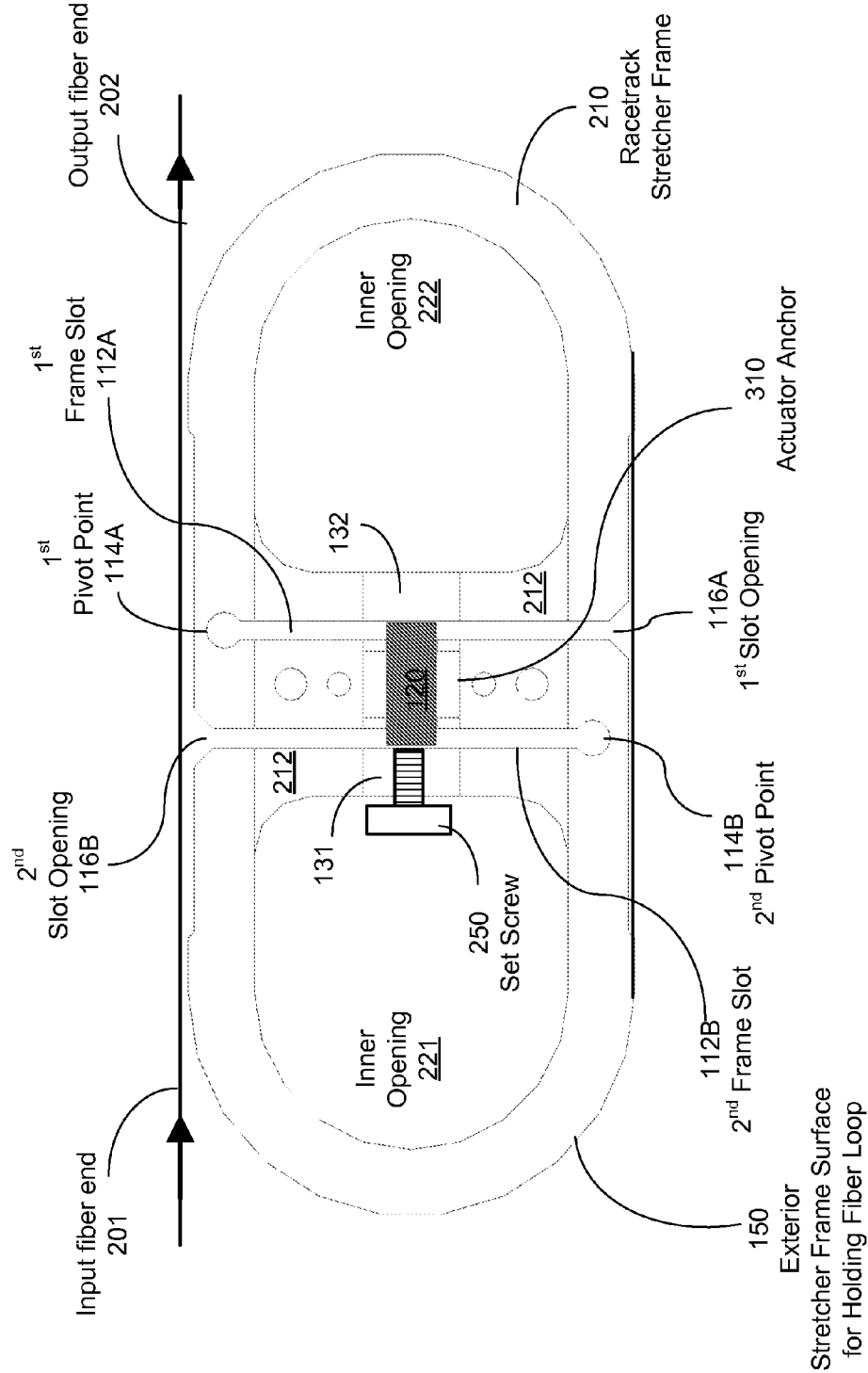
FIGS. 3A and 3B show one implementation of the design in FIG. 1 using a PZT linear actuator to control dimensions of two expandable slots in a stretcher frame.
Figure 3B:
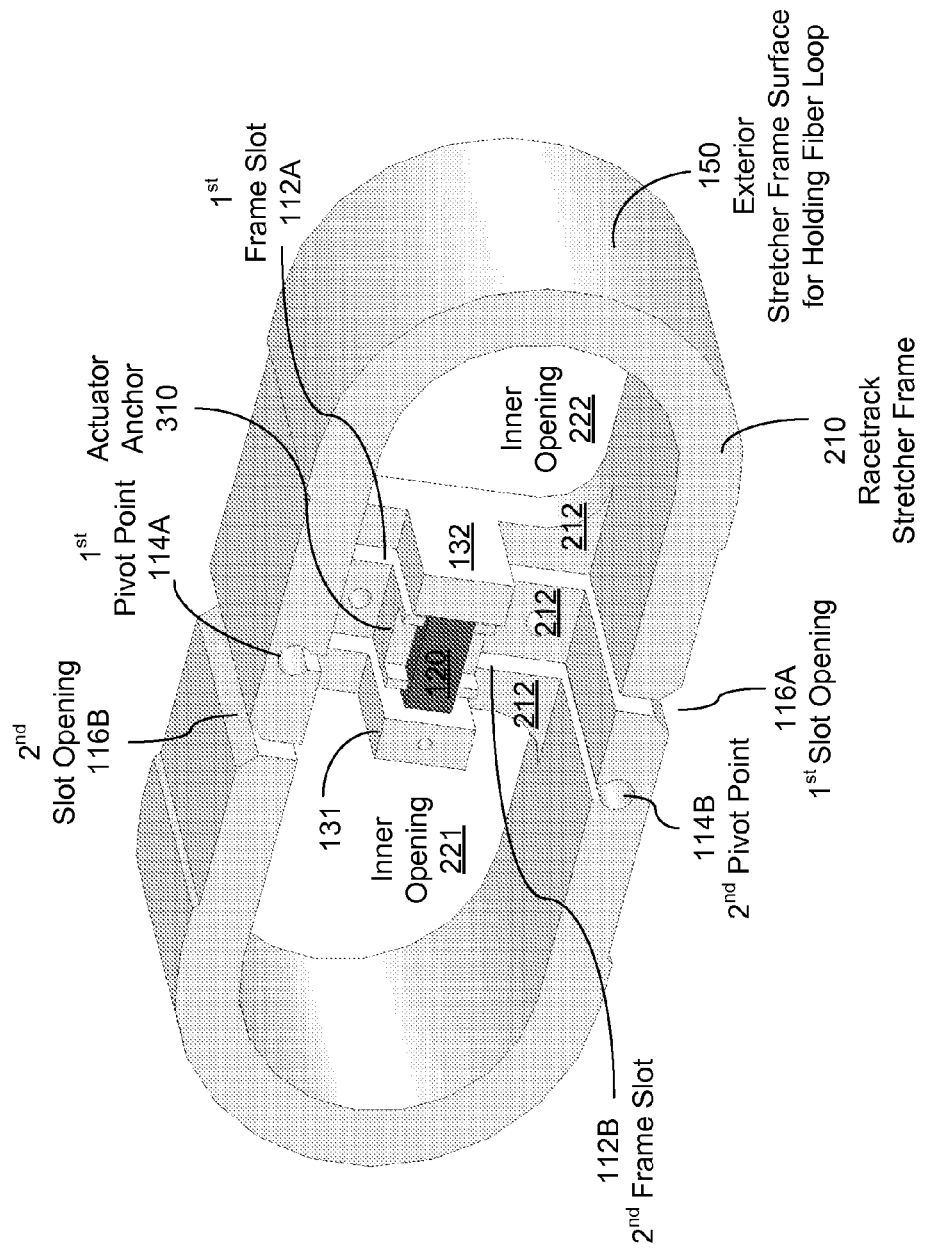

FIGS. 3A and 3B show one implementation of the design in FIG. 1 using a PZT linear actuator to control dimensions of two slots in a stretcher frame. The example for this implementation shown uses a racetrack geometry for the stretcher frame 210 similar to the geometry in FIGS. 2A and 2B. The interior portion 212 are structured to include two frame slots 112A and 112B. The first frame slot 112A has a first slot opening 116A at one end of the interior portion 212 and a first pivot point 114A at the other end of the interior portion 212. The second frame slot 112B has a second slot opening 116B at one end of the interior portion 212 and a first pivot point 114A at the other end of the interior portion 212. In this particular example, the two frame slots 112A and 112B are substantially parallel to each other and share a common actuator 120. The shared actuator 120 is engaged to across both frame slots 112A and 112B to control the slot openings 116A and 116B, respectively. The two expandable frame slots 112A and 112B divide the interior portion 212 into three sections having three actuator anchors 131, 310 and 132, respectively. The shared actuator 120 is mounted on the three actuator anchors 131, 310 and 132 to control the spacing of the first frame slot 112A based on the displacement of the actuator 120 between the anchors 310 and 132 and the spacing of the second frame slot 112B based on the displacement of the actuator 120 between the anchors 210 and 131. Therefore, the two expandable slots 112A and 112B allow fibers on both sides of the race-track to be stretched to increase the stretching range in comparison with the fiber stretcher device in FIGS. 2A and 2B with a single expandable frame slot 112.

Figure 4A:
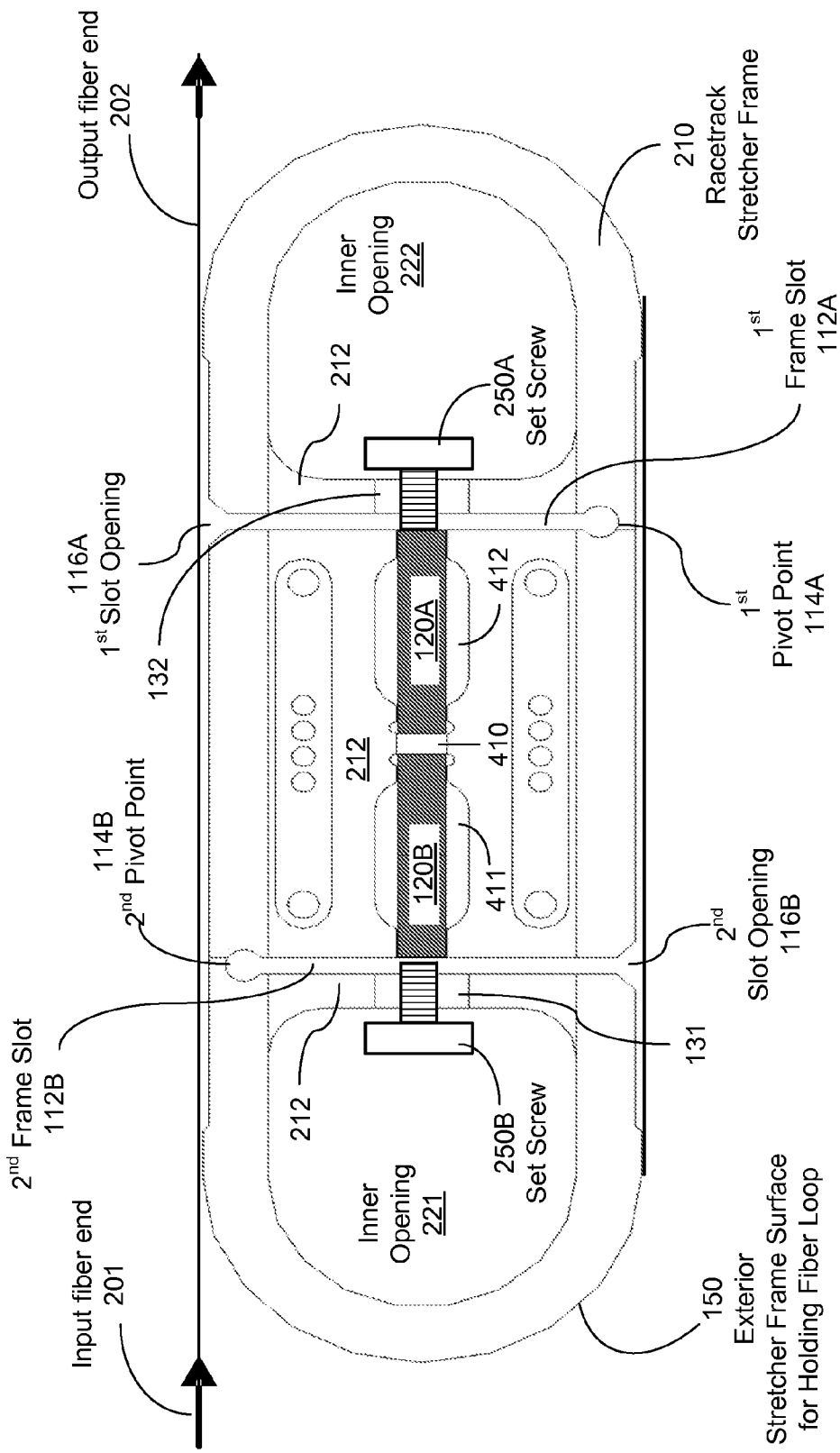
FIGS. 4A and 4B show one implementation of the design in FIG. 1 using two or more PZT linear actuators to control dimensions of two expandable slots in a stretcher frame.
Figure 4B:
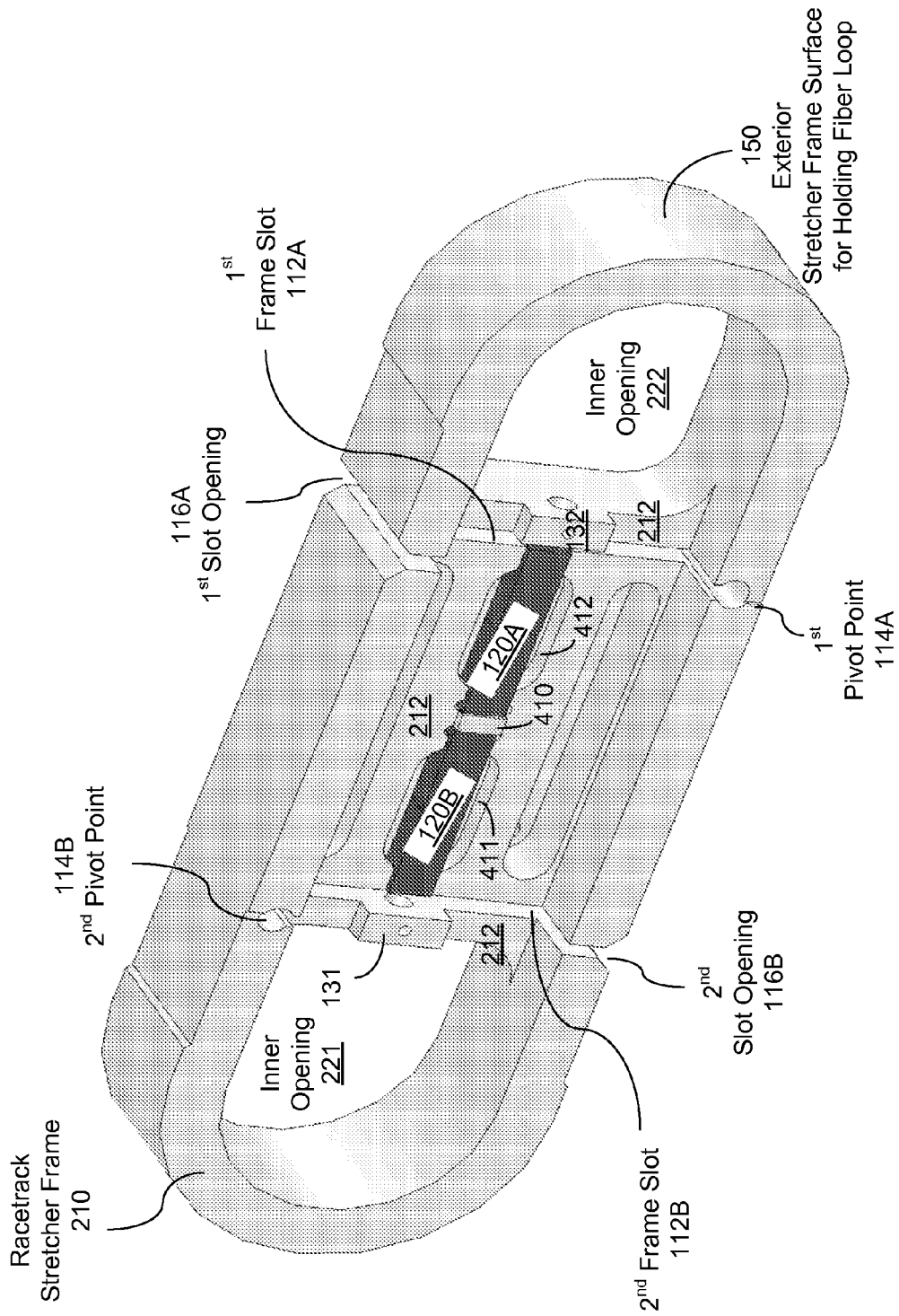

FIGS. 4A and 4B show one implementation of the design in FIG. 1 using two or more PZT linear actuators to control dimensions of two expandable slots in a stretcher frame. Two linear actuators 120A and 120B are cascaded in series by actuator anchors 131, 411, 410, 412 and 132 on the interior portion 212. The first linear actuator 120A is engaged to anchors 410, 412 and 132 to control the spacing of the first expandable frame slot 112A. A first set screw 250A is engaged to press the first actuator 120A to apply a preload. The second linear actuator 120B is engaged to anchors 410, 411 and 131 to control the spacing of the second expandable frame slot 112B. A second set screw 250B is engaged to press the second actuator 120A to apply a preload. The anchor 410 is shared by two actuators 120A and 120B. Alternatively, the two actuators 120A and 120B can be directly in contact with each other without the middle anchor 410.

Figure 5A:
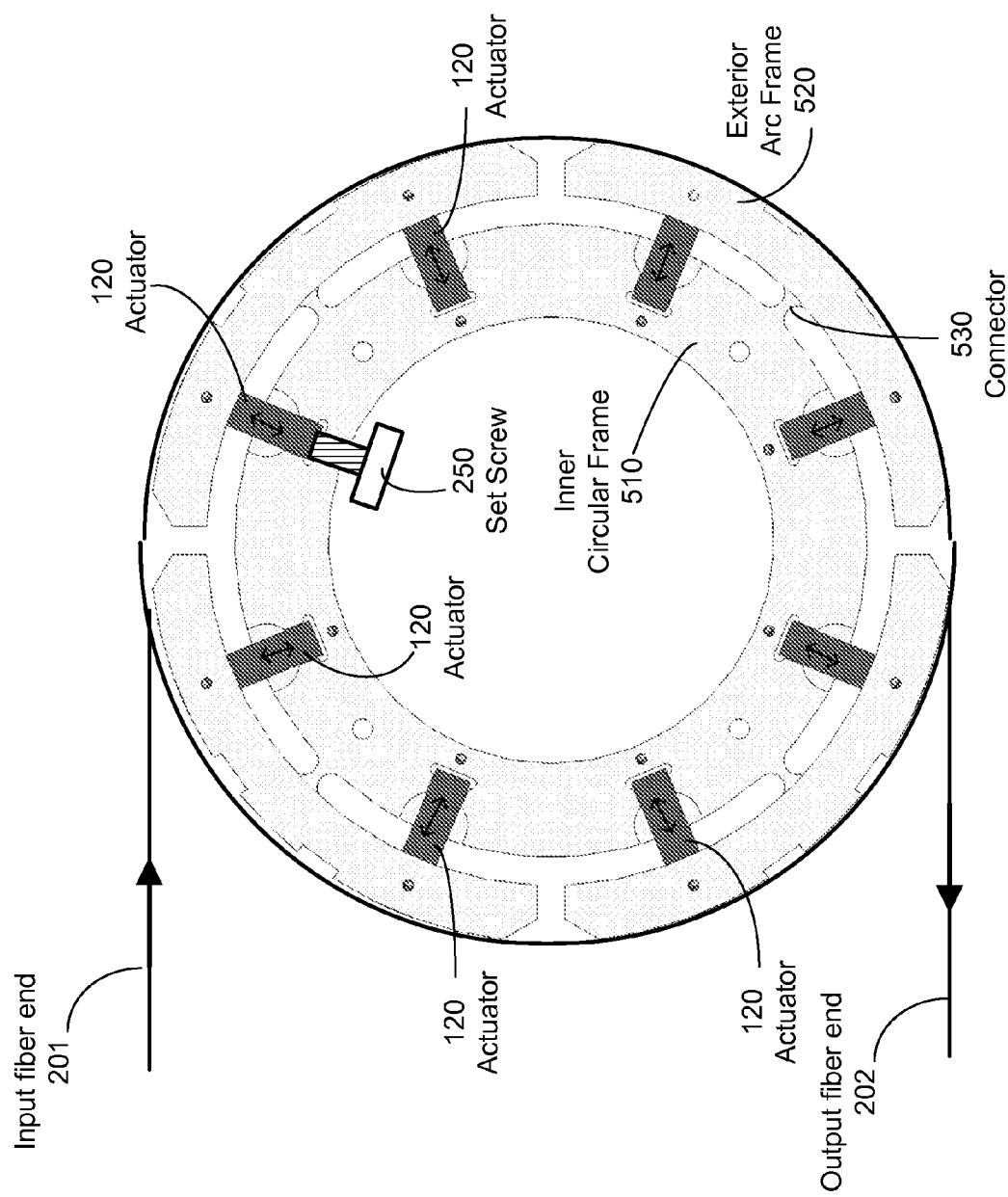
FIGS. 5A and 5B show one exemplary design a fiber stretcher device using multiple actuators arranged in a radial configuration to control a radial dimension of a stretcher frame.
Figure 5B:
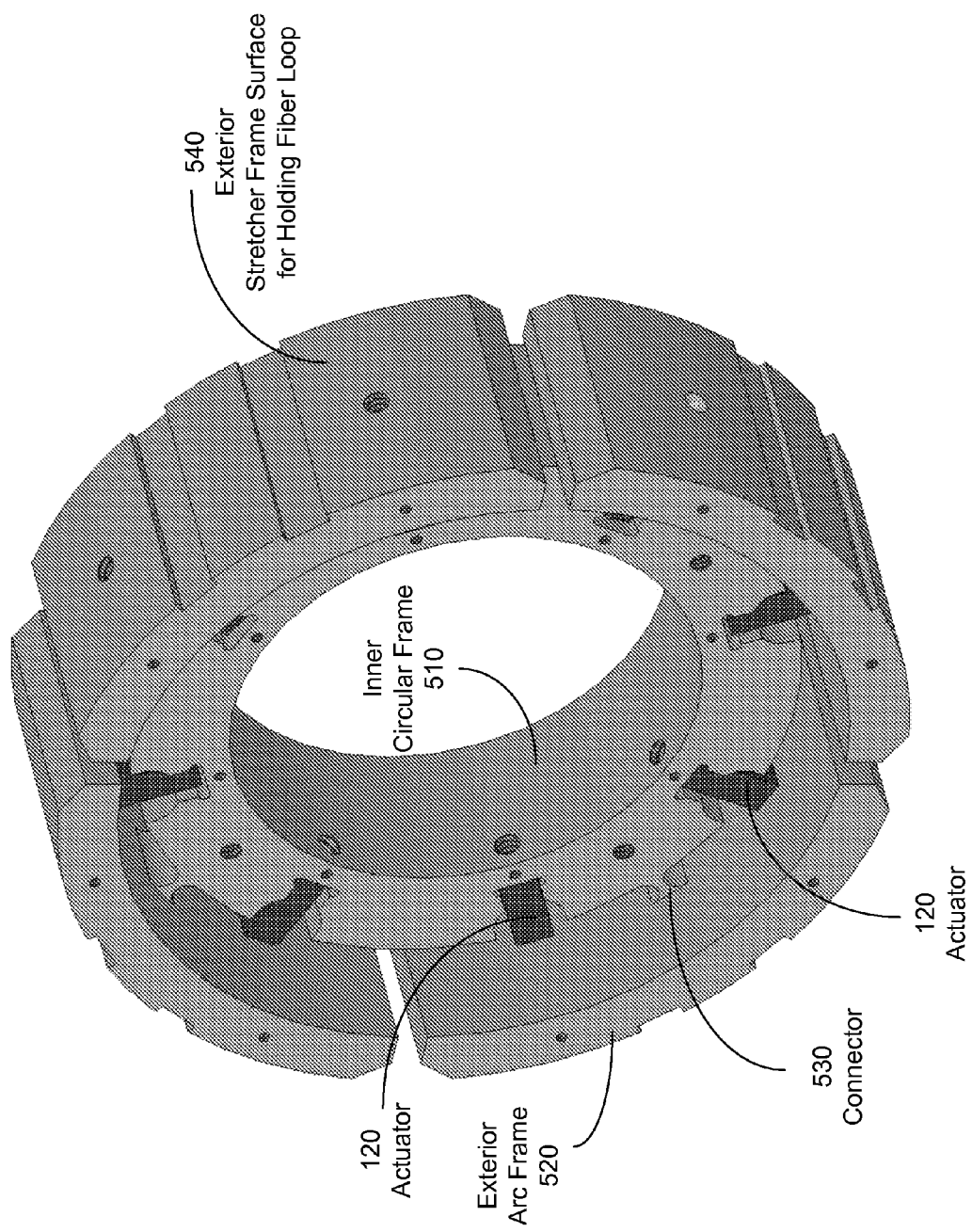

FIGS. 5A and 5B show one exemplary design a fiber stretcher device using multiple linear actuators arranged in a radial configuration to control a radial dimension of a stretcher frame. In this example, the fiber stretcher frame includes an inner circular frame 510, and multiple exterior arc frames 520 circularly arranged around the inner circular frame 510 to form an outer circle concentric with the inner circular frame. Each exterior arc frame 520 is connected to the inner circular frame 510 via a connector 530 so that the inner circular frame 510, the connectors 530 and the exterior arc frames 520 for an integral structure. Each exterior arc frame 520 can be pulled outward along the radial direction by stretching the connector 530 by different amounts to change its radial position and to stretch the fiber loop on the exterior arc frames 520. The inner circular frame 510, the connectors 520 and the exterior arc frames 520 may be made from a metal or a non-metal material.

In this design, for each exterior arc frame 520, two linear actuators 520 are symmetrically positioned on opposite sides of the connector 530 and are engaged to the inner side of the exterior arc frame 520 and the outer surface of the inner circular frame 510. Each linear actuator 520 is oriented along the radial direction and to expand or contract along the radial direction. The linear actuators 520 are engaged to the inner circular frame 510 and arranged to form a circle concentric to the inner circular frame 510. The dimension and shape of the connector 530 are designed to allow for expansion and contraction along the radial direction to change the spacing between the exterior arc frame 520 and the inner circular frame 510 under action of the two actuators 520. The exterior surfaces 540 of the exterior arc frames 520 collectively form a circular exterior surface to hold the fiber loop.

Similar to other designs, the linear actuators 120 can be mounted to apply an initial stretch on the connectors 530 to create an initial fiber stretch condition. Set screws 250 can be installed on the inner circular frame 510 at locations of the linear actuators 120, respectively, to press each linear actuator 120 to stretch the connector 520 at a preload. A control circuit is used to apply control signals to all actuators 120 to expand or contract the fiber loop that is wrapped around the exterior arc frames 520. Each linear actuator 120 can be controlled separately for more flexibility in operation.

The fiber stretchers described in this application can be designed to set their resonant frequencies close to selected frequencies of interest. The resonant frequencies of such a fiber stretcher depend on a number of device parameters, including the mass of the mechanical structure, the actuator's capacitance, resistance, and resonant frequencies, the Young's modules of the fiber and the material of the mechanical structure, the number of turns of the fiber wound around the fiber stretcher, and the mounting mechanism.

Figure 6A:
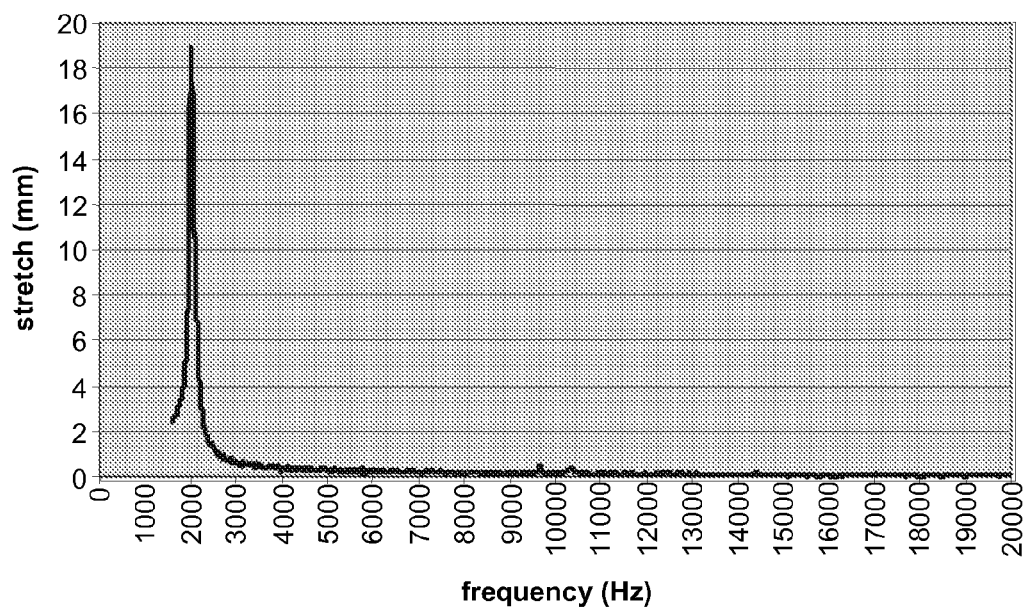
FIGS. 6A and 6B illustrate frequency responses of an exemplary fiber stretcher based on the design in FIG. 1.
Figure 6B:
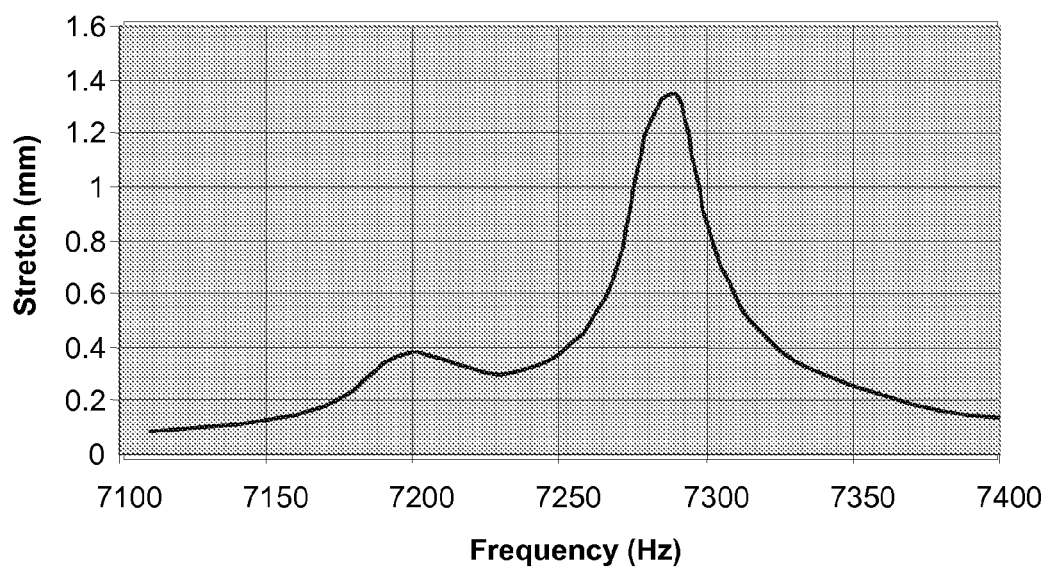

FIG. 6A illustrates frequency responses of an exemplary fiber stretcher based on the design in FIGS. 4A and 4B. The fiber stretcher exhibits a 5 mm total stretch at low frequencies, and a large stretch of 19 mm at a resonant frequency around 2 kHz. FIG. 6B shows other fiber stretchers designed for other resonant frequencies. At frequency around 7.5 kHz, a stretch range of 1.4 mm can be achieved.

Fiber stretchers based on the above designs can be used in various applications and devices. For example, fiber-based time-domain optical coherent tomography (OCT) devices can use one or more such fiber stretchers to control and adjust the relative optical delay between the reference optical path and the sample optical path in OCT measurements. FIGS. 7, 8, 9 and 10 show examples of fiber-based optical interferometer systems such as the time-domain optical coherent tomography (OCT) devices using at least one fiber stretcher based on one of the designs in this application.

Figure 7:
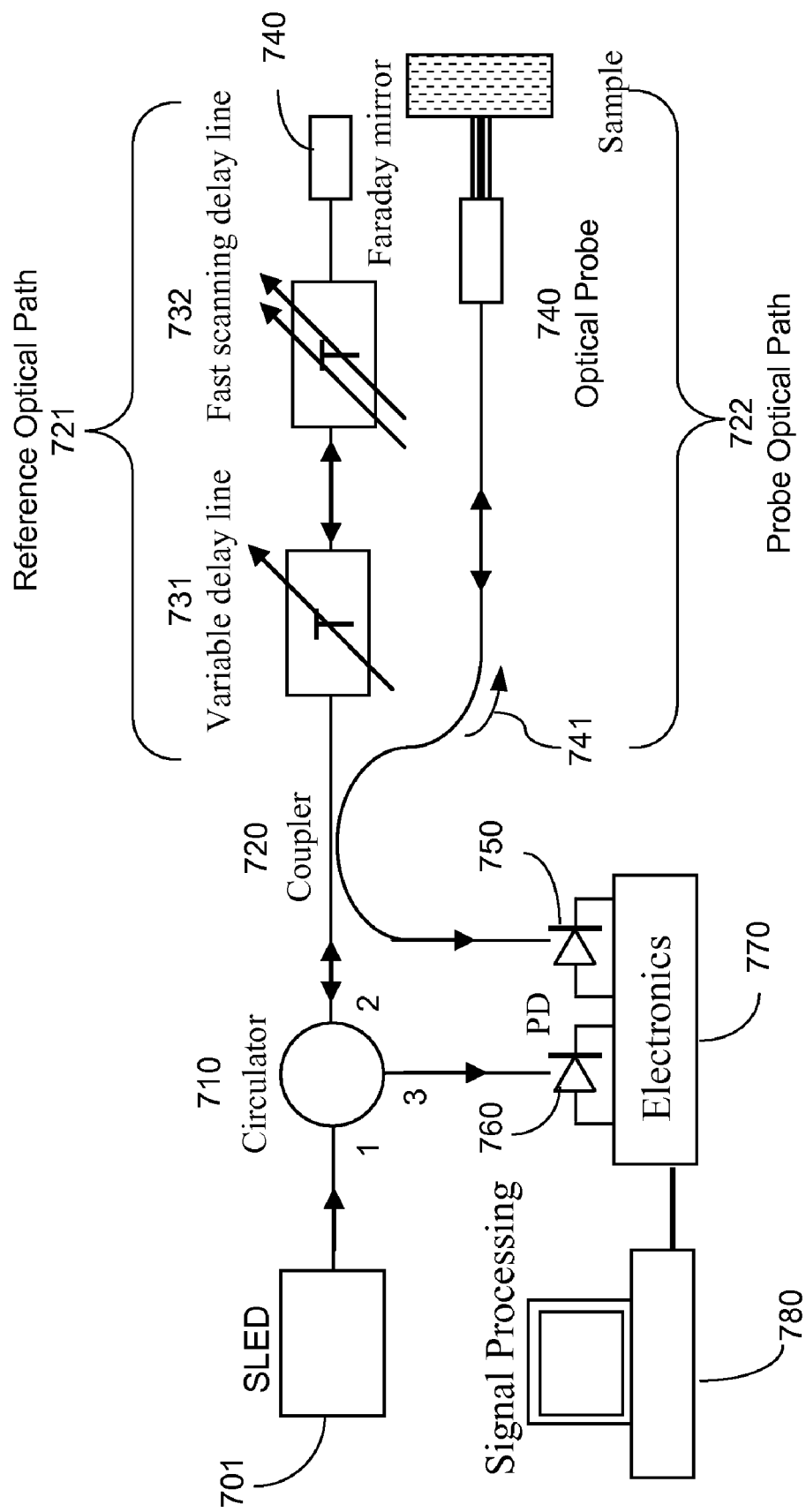
FIGS. 7, 8, 9 and 10 show examples of fiber-based optical interferometer devices using at least one fiber stretcher based on one of the designs in this application.

FIG. 7 shows a time domain OCT device having a reference optical path 721 and a probe optical path 722 that directs a probe beam 741 to a sample under measurement. A broadband light source 701, such as a superluminance light emitting diode (SLED), is used to produce probe light of a broadband optical power spectrum for OCT measurements. An optical coupler 720 splits the probe light into a reference beam to the reference optical path 721 and the probe beam 741 into the probe optical path 722. A reference reflector 740, such as a Faraday mirror formed by a Faraday rotator and a mirror, can be used to reflect the reference beam back with a controlled variable optical delay. A variable optical delay device, such as a variable delay line 731 and a fast scanning delay line 732, is provided in the reference optical path 721 to control the optical delay in the reflected reference beam. An optical probe 740 is provided at the distal end of the probe optical path 722 to direct the probe beam 741 to the sample and to collect reflected light from the sample. The collected light from the sample is directed by the optical probe 740 in the probe optical path back to the optical coupler 720 to mix with the reflected reference beam to interfere. The optical interference signal is directed to an optical detector 750. An optical circulator 710 may be placed between the light source 701 and the coupler 720 to direct the probe light from the light source 701 entering the port 1 to the port 2 to output to the coupler 720. The returned interference light from the coupler 720 to the port 2, which is optically complementary to the interference signal directed to the detector 750, is routed by the circulator 710 to another optical detector 760. A detector circuit 770 is coupled to the detectors 750 and 760 to process the detector output signals and to interface with an OCT signal processing unit 780 which processes the output from the detector electronics 770 to generate OCT measurements of the sample. The two optically complementary interference signals received by detectors 750 and 760 can be subtracted to remove common-mode noise from the light source 701 and to increase the detected signal to noise ratio.

The variable optical delay device in the reference optical path 721 can be a fiber delay line and include a fiber stretcher based on a design in this application. For example, a fiber stretcher based on a design in this application can be the fast scanning delay line 732.

Figure 8:
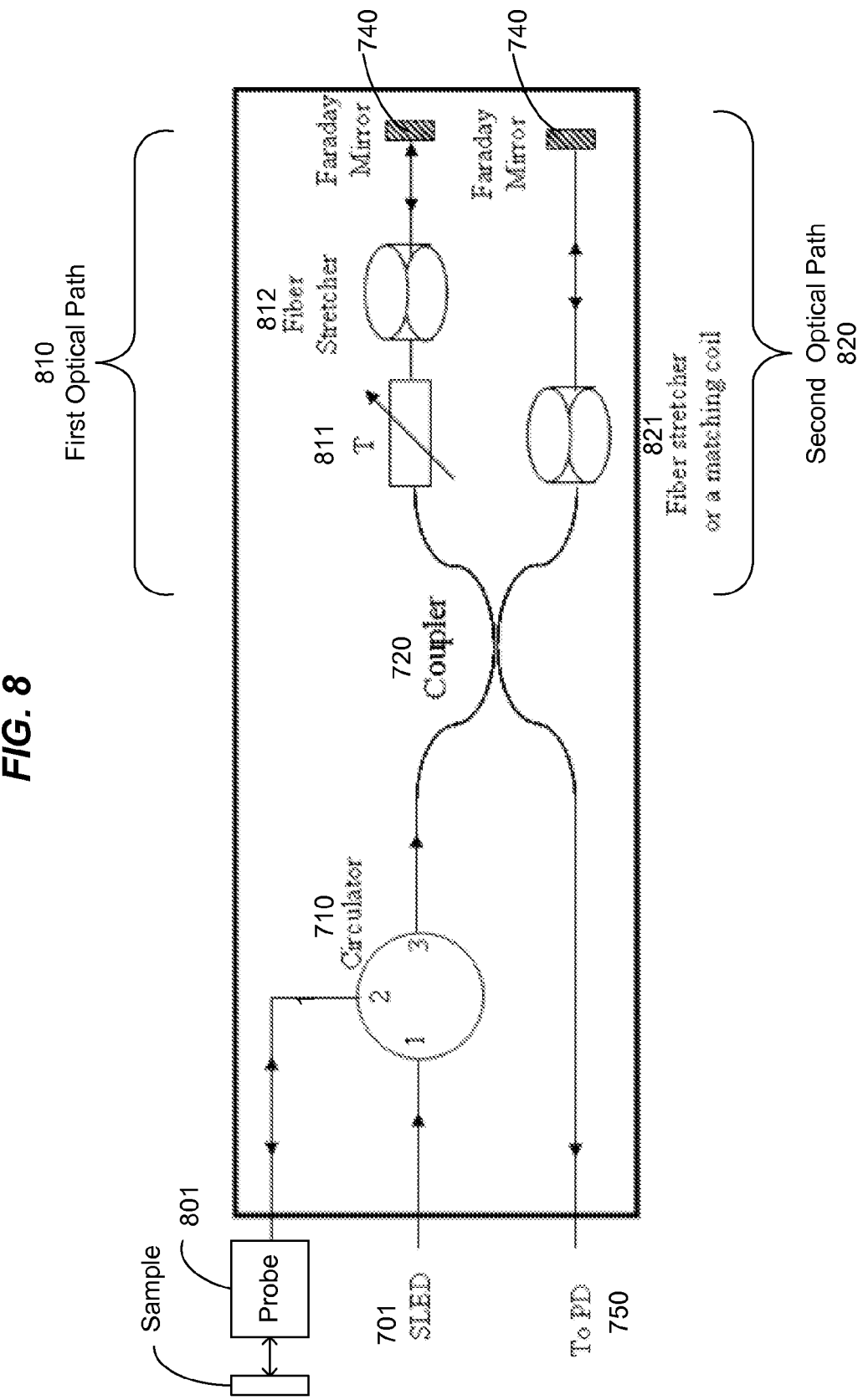

FIG. 8 shows an example of an optical interferometer device that implements a fiber stretcher based on a design described in this application. The light source 701 (e.g., SLED) is used to produce a probe beam for optically probing a sample placed near an optical probe head 801. An optical circulator 710 with ports 1, 2 and 3 is coupled in the path of the probe beam from the light source 701 to direct light at the port 1 to the port 2 and to direct light at the port 2 to the port 3. Therefore, the probe beam from the light source 701 is received at the port 1 by the circulator 710 and is output at the port 2 to the optical probe head 801. A segment of optical fiber can be used to connect the optical probe head 801 to the port 2 of the circulator 710. The optical probe head 801 directs the probe beam to the sample and collects reflected light from the sample. The optical probe head 801 can be configured to reflect a fraction of the probe beam back to the port 2 as a reference beam for that interferometer and transmit the remaining of the probe beam out of the fiber towards the sample. The probe beam directed to the sample interacts with the sample and a portion of light in the probe beam at the sample is reflected back to the probe head 801. This reflected light from the sample contains information of the sample. The probe head 801 can include a focusing lens to direct the beam to the sample and to collect reflected light from the sample. In one implementation, the probe head can include a partial reflective fiber termination that reflects a fraction of the probe beam back to the port 2 as the reference beam for the interferometer and transmits the remaining of the probe beam out of the fiber towards the sample. In another implementation, the fiber termination may be non-reflective and a reference reflection may be incorporated into the sample. This aspect of the optical probe head 801 is described in U.S. Pat. No. 6,847,453 to Bush.

The reference beam and the reflected probe light from the sample are directed by the optical probe head 801 to the port 2 of the circulator 710 which directs the received light to the port 3. An optical coupler 720 receives the light from the port 3 of the circulator 710 and splits the received light into first and second beams along two fiber paths 810 and 820, respectively. The first optical path 810 includes a variable fiber delay line which can include, e.g., an optical tunable delay 811 and a fiber stretcher 812. A reflector 740, such as a Faraday mirror, is coupled to the distal end of the first optical path 810 to reflect light back to the coupler 720. The second optical path 880 includes a variable fiber delay line 821 which can a fiber stretcher engaged to a fiber coil or loop. A reflector 740, which can be a Faraday mirror, is coupled to the distal end of the second optical path 820 to reflect light back to the coupler 720. The reflected beams from the two paths 810 and 820 mix with each other at the coupler 720 to produce an interference signal. The coupler 720 splits the interference signal into two complementary interference signals, one being directed to a photodetector 750 for processing and the other being terminated at the optical circulator 710. At least of the fiber stretchers 812 and 821 in FIG. 8 can be implemented based on design in this application.

In operation, the relative optical delay between the first and second optical paths 810 and 820 is adjusted to select reflected light from the sample at a particular depth of the sample to interfere with the reference beam produced by the optical probe head 801 to produce the interference signal detected at the detector 750. The relative optical delay between the first and second optical paths 810 and 820 can be adjusted to produce different relative delay values to process reflected light from the sample at different sample depths.

Figure 9:
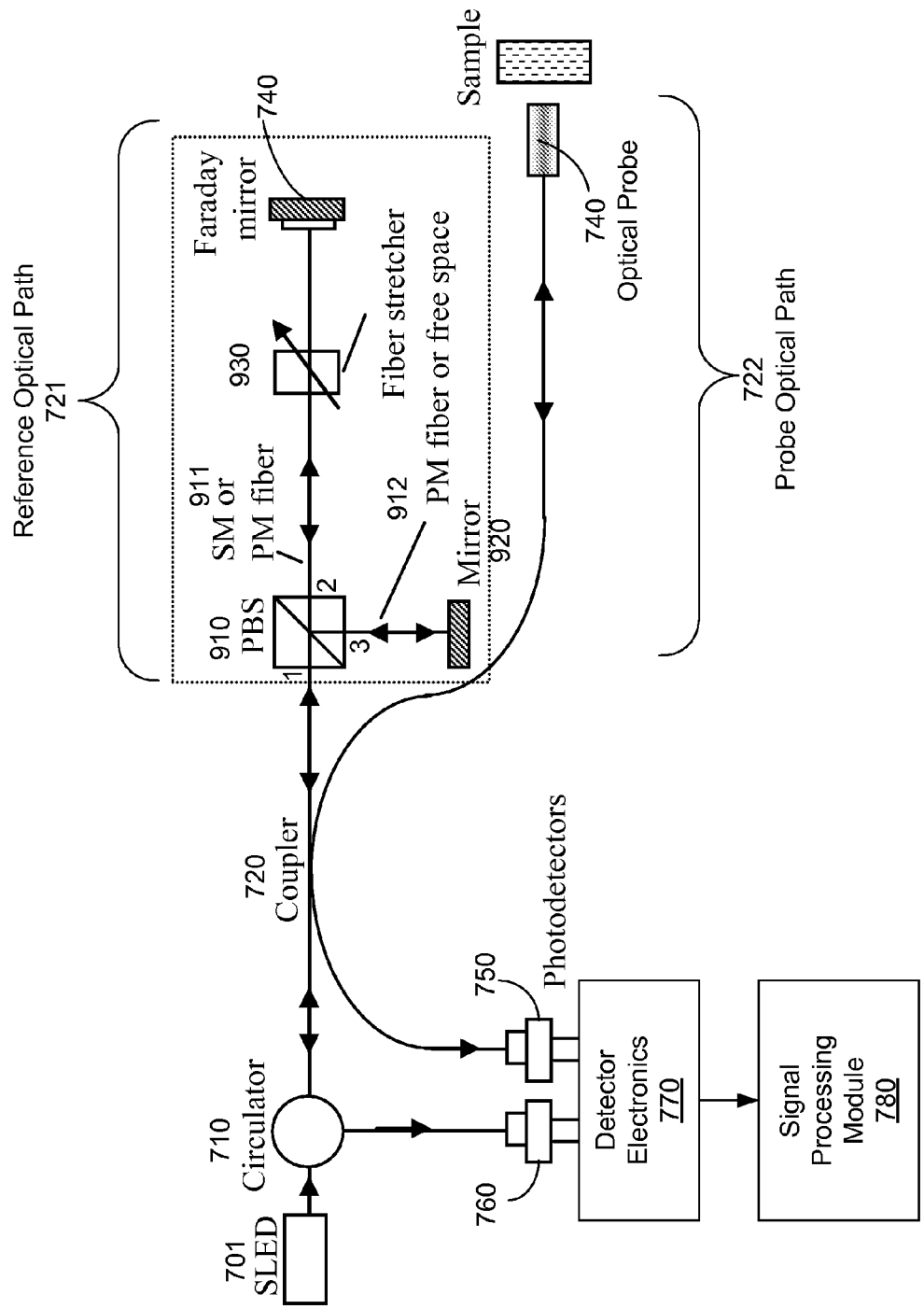
Figure 10:
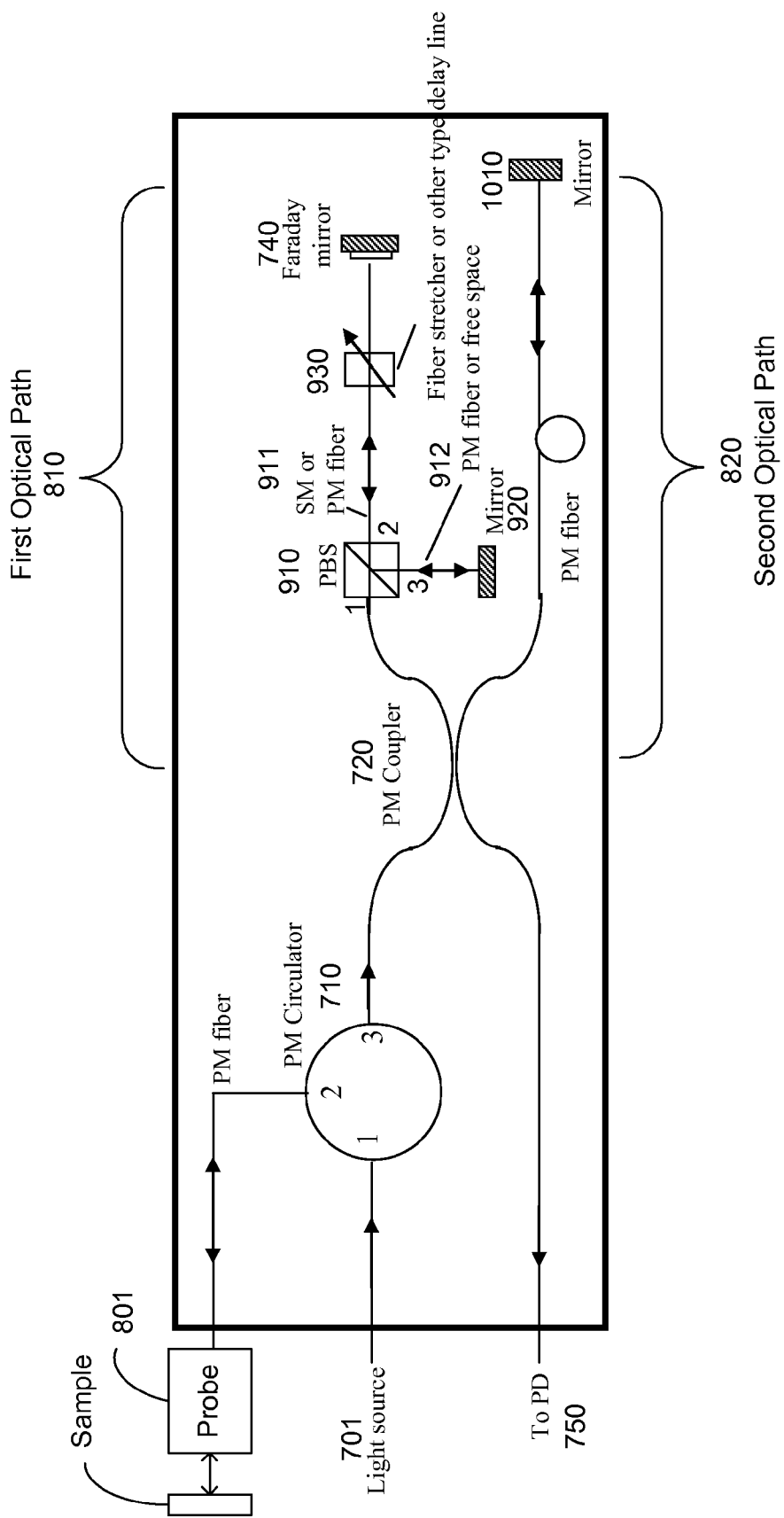

FIGS. 9 and 10 show alternative implementations of the interferometer devices in FIGS. 7 and 8, respectively, based on an optical reference delay device that directs the received light to pass through a delay element four times so as to quadruple the optical delay produced by the delay element.

The device in FIG. 9 uses the reference optical path 721 in FIG. 7 uses an optical polarization beam splitter (PBS) 910 to receive a linearly polarized input light from the coupler 720. The PBS 910 includes a first port 1, a second port 2 and a third port 3. The input light beam, which is linearly polarized at a first optical polarization, is directed into the port 1 of the PBS 910 and transmits through the PBS 910 between the first port 1 and the second port 2. The PBS 910 is configured to reflect light at a second optical polarization orthogonal to the first optical polarization, that enters the PBS 910 at either of the second port 2 and the third port 3, to the other of the second port 2 and the third port 3. Two optical paths are connected to the PBS 910. A first optical path 911 is provided as the optical delay path having a first end optically coupled to the second port 2 of the PBS 910 to receive light from the second port 2 and to direct light back to the second port 2 and a Faraday reflector 740 coupled to a second end of the first optical path 911 to reflect light. The Faraday reflector 740 can be implemented by a Faraday rotator in the front and a reflector in the back to reflect light received from the first optical path 911 back to the first optical path 911 with a reflected optical polarization that is, at each location along the first optical path 911, orthogonal to an optical polarization of the light when traveling in the first optical path 911 from the PBS 910 towards the Faraday reflector 740 prior to the reflection. The second optical path 912 has a first end optically coupled to the third port 3 of the PBS 910 to receive light from the second port 2 and to direct light to the third port 3. A reflector 920 is coupled to a second end of the second optical path 912 to reflect light received from the second optical path 912 back to the second optical path 912 with a reflected optical polarization that is the same as an optical polarization of the light at the third port 3 when initially entering the second optical path 912. Hence, the light reflected by the reflector 920 back to the port 2 of the PBS 910 remains in the second polarization and thus is reflected by the PBS 910 to the port 2 to travel in the first optical path 911 for the second time. After reflecting back by the Faraday rotator 740 for the second time, the light returns to the port 2 of the PBS 910 in the first polarization and thus transmits through the PBS 910 to emerge at the port 1 as a returned output light beam. Under this design, the input beam in the first polarization received at the port 1 of the PBS 910 travels through the first optical path 912 four times and the second optical path 912 two times and returns to the port 1 as the output light. A fiber delay loop or coil can be used as part of the first optical path 911 to quadruple the amount of the delay of the fiber loop.

The delay produced by the reference optical path can be made variable by incorporating a variably element in either or both of the optical paths 911 and 912. In FIG. 9, a fiber loop is used to form the first optical path 911 and a variable optical delay 930 in the first optical path 911 is used to produce a variable delay in the output. This variable delay 930 is a fiber stretcher engaged to a fiber loop as described in several implementations in this application. The variable optical delay fiber stretcher 930 can be engaged to a single mode (SM) fiber or a polarization maintaining (PM) fiber that is used to form the optical path between the port 2 of the PBS 910 and the Faraday rotator 740. With this configuration, and a delay change is amplified four times. Alternatively, the variable delay can be implemented in the optical path formed by the port 3 of the PBS 910 and the mirror 920 where the a delay change is doubled.

In operation, the PBS 910 is used to receive an input light signal before directing the signal to the delay fiber in the first optical path 911. The polarization of the input light signal is controlled so that the input light signal is in the linear polarization that transmits through the PBS 910. The PBS 910 has three ports: port 1 to receive the input light signal 101, port 2 to receive the transmission of light received at the port 1 and port 3 to which a reflected signal produced by reflection of the light received at the port 2 is directed. In particular, the polarization of the light that enters the port 1 and transmits through the PBS 910 at the port 2 is orthogonal to the polarization of light that enters the PBS 910 at port 2 and is reflected to exit the PBS 910 at the port 3. The delay fiber in the first optical path 911 is optically connected to the port 2 of the PBS 910 to, at least, (1) receive optical transmission of light received at port 1, and (2) receive optical reflection of light received at port 3 and reflected by the PBS 910. The Faraday reflector 740 is placed at the end of the delay fiber to reflect light that transmits through the delay fiber for the second time back to the PBS 910. The Faraday rotator is a 45-degree Faraday rotator to effectuate an ortho-conjugate property: the state of polarization (SOP) of the reflected light by the Faraday reflector 740 is orthogonal to the forward going beam at every point along the fiber in the first optical path 110. As a result, at the PBS 910, the SOP of the reflected signal is orthogonal to that of the forward going light and therefore all light signal is directed to port 3 of the PBS 910. The reflector 920 placed at the end of port 3 reflects the light from the port 3 back to the port 3 of the PBS 910 without changing its SOP. The reflector 940 can be a mirror that is directly attached to or formed on the facet of the port 3, or can be separated from the PBS 910 with a medium, such as a PM fiber or a free-space, as long as the SOP of the light is not changed when the light is directed back to the port 3 by the mirror 920. Because the reflected light from the mirror 920 retains its SOP, the PBS 910 reflects the reflected light from the mirror 920 to exit the PBS 910 at the port 2 to transmit through the delay fiber in the first optical path 911 for the third time and is reflected by the Faraday rotator 740 for the second time. This reflected light from the Faraday reflector 740 passes through the delay fiber for the fourth time to reach port 2 of the PBS 910. At the PBS 910, the SOP of the twice-reflected light by the Faraday mirror 740 is orthogonal to the SOP for the light that is reflected by the PBS 910 from the port 3 to the port 2 and, therefore, is the same as that of the input light received at the port 1. As a result, the twice-reflected light by the Faraday reflector 740, when entering the port 2, transmits through the PBS 910 to the input port 1 of the PBS 910. Therefore, the light passes the delay fiber totally 4 times before exiting the PBS 103 as the output light 102.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. An optical fiber device, comprising:
a linear actuator responsive to a control signal to cause a dimensional change along a straight line;
a fiber stretcher frame comprising at least one expandable slot that is engaged to the actuator so that the dimensional change along the straight line is across the expandable slot to change a width of the expandable slot, the fiber stretcher frame structured to amplify the dimensional change of the actuator to produce an amplified change in a circumference of an exterior surface of the fiber stretcher frame; and
a fiber loop wrapping around the exterior surface of the fiber stretcher frame that changes a length of the fiber loop with the amplified change in the circumference of the exterior surface of the fiber stretcher frame.

2. The device as in claim 1, wherein:
the fiber stretcher frame is partially divided into a first frame part and a second frame part by the expandable slot, wherein the first frame part and the second frame part are integral to each other and are connected at a pivot point around which the first and second frame parts move relative to each other under an operation of the actuator.

3. The device as in claim 2, comprising:
a first actuator anchor on the first frame part to hold a first end of the actuator;
a second actuator anchor on the second frame part to hold a second end of the actuator and spaced from the first actuator anchor to exert an initial load on the first and second frame parts to set an initial width of the expandable slot which produces an initial stretch on the fiber loop,
wherein the actuator is operable to expand or contract to increase or decrease the initial stretch on the fiber loop, respectively.

4. The device as in claim 3, comprising:
a screw mounted to the first actuator anchor and engaged to press against the first end of the actuator, the screw being adjustable to change a position of the actuator relative to the first actuator anchor to change the initial stretch.

5. The device as in claim 3, comprising:
at least one of the first and second actuator anchors is adjustable in position to change the initial width of the expandable slot and thus the initial stretch.

6. The device as in claim 1, wherein:
the fiber stretcher frame includes a first frame part and a second frame part that are separated from each other by the expandable slot, and a resilient connector that connects the first frame part and the second frame part at a pivot point around which the first and second frame parts move relative to each other under an operation of the actuator.

7. The device as in claim 6, comprising:
a first actuator anchor on the first frame part to hold a first end of the actuator;

a second actuator anchor on the second frame part to hold a second end of the actuator and spaced from the first actuator anchor to exert an initial load on the first and second frame parts to set an initial width of the expandable slot which produces an initial stretch on the fiber loop, wherein the actuator is operable to expand or contract to increase or decrease the initial stretch on the fiber loop, respectively.

8. The device as in claim 7, comprising:

a screw mounted to the first actuator anchor and engaged to press against the first end of the actuator, the screw being adjustable to change a position of the actuator relative to the first actuator anchor to change the initial stretch.

9. The device as in claim 6, comprising:

at least one of the first and second actuator anchors is adjustable in position to change the initial width of the expandable slot and thus the initial stretch.

10. The device as in claim 1, wherein:

the exterior surface of the fiber stretcher frame includes straight sections and curved sections, and wherein the fiber loop is fixed to the exterior surface in a way that each fiber segment in the fiber loop located in a curved section is isolated from expansion and extraction of the stretcher frame and each fiber segment in the fiber loop located in a straight section expands and contracts with the stretcher frame.

11. The device as in claim 10, wherein:

each fiber segment in the fiber loop located in a straight section is fixed at both ends of the straight section to isolate an adjacent fiber segment in the fiber loop located on an adjacent curved section from expansion and extraction of the stretcher frame.

12. The device as in claim 11, wherein:

each fiber segment in the fiber loop located in a straight section is fixed at both ends of the straight section by an adhesive.

13. The device as in claim 1, wherein:

the fiber stretcher frame comprises a second expandable slot located adjacent to the first expandable slot; and the actuator engaged to the expandable slot is also engaged to two sides of the second expandable slot to control widths of both the expandable slot and the second expandable slot in response tot the control signal.

14. The device as in claim 1, wherein:

the fiber stretcher frame comprises a second expandable slot; and the device comprises a second linear actuator engaged to the second expandable slot to change a width of the second expandable slot as the second linear actuator exhibits a dimensional change along a straight line, the fiber stretcher frame structured to amplify the dimensional change of the second linear actuator to, collectively with the actuator engaged to the expandable slot, amplify a change in the circumference of the exterior surface of the fiber stretcher frame.

15. The device as in claim 1, wherein:

the linear actuator is a piezo-electric actuator, an electrostrictive actuator, a magneto-strictive actuator, a magneto-mechanical actuator, or a linear motor actuator.

16. The device as in claim 1, comprising:

an optical polarization beam splitter (PBS) having a first port, a second port and a third port, wherein light at a first optical polarization transmits through the PBS between the first port and the second port, and light at a second optical polarization orthogonal to the first optical polarization that enters at either of the second port and the third port is reflected to the other of the second port and the third port;

a first optical path having a first end optically coupled to the second port of the PBS to receive light from the second port and to direct light to the second port;

a Faraday reflector coupled to a second end of the first optical path to reflect light received from the first optical path back to the first optical path with a reflected optical polarization that is, at each location along the first optical path, orthogonal to an optical polarization of the light when traveling in the first optical path from the PBS towards the Faraday reflector prior to the reflection;

a second optical path having a first end optically coupled to the third port of the PBS to receive light from the second port and to direct light to the third port; and a reflector coupled to a second end of the second optical path to reflect light received from the second optical path back to the second optical path with a reflected optical polarization that is the same as an optical polarization of the light at the third port when entering the second optical path, wherein the fiber loop wrapped around the fiber stretcher frame is connected as part of the first optical path between the Faraday reflector and the PBS to produce a variable optical delay in light in the first optical path as the control signal applied to the actuator changes.

17. The device as in claim 1, comprising:

a first optical path comprising a first end and a second end that includes a reflector to direct light received from the first end back to the first end;

a second optical path comprising a first end and a second end that includes a reflector to direct light received from the first end back to the first end; and an optical coupler that couples the first and second optical paths to each other at the first end of the first optical path and the first end of the second optical path to split an input beam into a first beam into the first optical path and a second beam into the second optical path and to mix reflections of the first beam and the second beam to cause optical interference, wherein the fiber loop wrapped around the fiber stretcher frame is connected as part of the first optical path between the first end and the second end to produce a variable optical delay in light in the first optical path as the control signal applied to the actuator changes.

18. The device as in claim 17, comprising:

a light source to produce a probe beam;

an optical probe head coupled to receive the probe beam and to transmit a first part of the probe beam into a sample to collect reflected light from the sample as a sampling beam and to reflect a second part of the probe beam away from the sample to produce a reference beam to mix and co-propagate with the sampling beam as a returned probe beam, wherein optical probe head and the optical coupler are in communication to direct the returned probe beam as the input beam to the optical coupler; and an optical detector coupled to receive an interference signal produced by interference of light from the first and second optical paths at the optical coupler.

19. The device as in claim 18, comprising:

an optical circulator having a first port, a second port and a third port to receive the probe beam from the light source at the first port and to direct the received probe beam to the second port to which the optical probe head is coupled, and to direct the returned probe beam from the optical probe head to the third port to which the optical coupler is coupled to receive the returned probe beam.

20. An optical fiber device, comprising:

an inner circular frame;

a plurality of exterior arc frames separate from one another and arranged to surround the inner circular frame to form an outer circle concentric with the inner circular frame;

a plurality of connectors respectively connecting the plurality of exterior arc frames to an outer surface of the inner circular frame, one connector per exterior arc frame, wherein each connector holds each exterior arc frame to the inner circular frame as an integral structure;

a plurality of linear actuators arranged in a circle concentric with and engaged to the inner circular frame, each linear actuator oriented to expand or contract along a straight line in a radial direction of the inner circular frame and two linear actuators being engaged to one exterior arc frame symmetrically on two sides of a respective connector for the exterior arc frame to expand and contract to change a radial position of the exterior arc frame relative to the inner circular frame; and a fiber loop wrapping around the exterior surfaces of the exterior arc frames forming the outer circle under an initial stretch condition so that the fiber loop changes a length when the linear actuators expand and contract to change the circumference of the outer circle.

21. The device as in claim 20, comprising:

a plurality of screws mounted to the inner circular frame and engaged to press the linear actuators, respectively, along the radial direction against respective exterior arc frames, each screw being adjustable to change a position of a respective linear actuator to change the initial stretch on the fiber loop.

22. The device as in claim 20, wherein:

each linear actuator is a piezo-electric actuator, an electro-strictive actuator, a magneto-strictive actuator, a magneto-mechanical actuator, or a linear motor actuator.

23. The device as in claim 20, comprising:

an optical polarization beam splitter (PBS) having a first port, a second port and a third port, wherein light at a first optical polarization transmits through the PBS between the first port and the second port, and light at a second optical polarization orthogonal to the first optical polarization that enters at either of the second port and the third port is reflected to the other of the second port and the third port;

a first optical path having a first end optically coupled to the second port of the PBS to receive light from the second port and to direct light to the second port;

a Faraday reflector coupled to a second end of the first optical path to reflect light received from the first optical path back to the first optical path with a reflected optical polarization that is, at each location along the first optical path, orthogonal to an optical polarization of the light when traveling in the first optical path from the PBS towards the Faraday reflector prior to the reflection;

a second optical path having a first end optically coupled to the third port of the PBS to receive light from the second port and to direct light to the third port; and a reflector coupled to a second end of the second optical path to reflect light received from the second optical path back to the second optical path with a reflected optical polarization that is the same as an optical polarization of the light at the third port when entering the second optical path, wherein the fiber loop wrapping around the exterior surfaces of the exterior arc frames is connected as part of the first optical path between the Faraday reflector and the PBS to produce a variable optical delay in light in the first optical path as the control signal applied to the actuator changes.

24. The device as in claim 20, comprising:

a first optical path comprising a first end and a second end that includes a reflector to direct light received from the first end back to the first end;

a second optical path comprising a first end and a second end that includes a reflector to direct light received from the first end back to the first end; and an optical coupler that couples the first and second optical paths to each other at the first end of the first optical path and the first end of the second optical path to split an input beam into a first beam into the first optical path and a second beam into the second optical path and to mix reflections of the first beam and the second beam to cause optical interference, wherein the fiber loop wrapping around the exterior surfaces of the exterior arc frames is connected as part of the first optical path between the first end and the second end to produce a variable optical delay in light in the first optical path as the control signal applied to the actuator changes.

25. The device as in claim 24, comprising:

a light source to produce a probe beam;

an optical probe head coupled to receive the probe beam and to transmit a first part of the probe beam into a sample to collect reflected light from the sample as a sampling beam and to reflect a second part of the probe beam away from the sample to produce a reference beam to mix and co-propagate with the sampling beam as a returned probe beam, wherein optical probe head and the optical coupler are in communication to direct the returned probe beam as the input beam to the optical coupler; and an optical detector coupled to receive an interference signal produced by interference of light from the first and second optical paths at the optical coupler.

* * * * *

UNITED STATES PATENT AND TRADEMARK OFFICE
CERTIFICATE OF CORRECTION

PATENT NO. : 7,382,962 B1  Page 1 of 1
APPLICATION NO. : 11/850867
DATED : June 3, 2008
INVENTOR(S) : Xiaotian Steve Yao It is certified that error appears in the above-identified patent and that said Letters Patent is hereby corrected as shown below:

At Claim 13, column 13, line 45, please delete "tot" and insert --to--.

Signed and Sealed this

Twenty-sixth Day of May, 2009

JOHN DOLL
*Acting Director of the United States Patent and Trademark Office*